US012485657B2

(12) United States Patent
Flat et al.

(10) Patent No.: US 12,485,657 B2
(45) Date of Patent: Dec. 2, 2025

(54) MULTI-LAYER STRUCTURE FOR STORING HYDROGEN

(71) Applicant: ARKEMA FRANCE, Colombes (FR)

(72) Inventors: Jean-Jacques Flat, Serquigny (FR); Patrick Dang, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 205 days.

(21) Appl. No.: 18/246,743

(22) PCT Filed: Sep. 28, 2021

(86) PCT No.: PCT/FR2021/051665
§ 371 (c)(1),
(2) Date: Mar. 27, 2023

(87) PCT Pub. No.: WO2022/069826
PCT Pub. Date: Apr. 7, 2022

(65) Prior Publication Data
US 2023/0356514 A1    Nov. 9, 2023

(30) Foreign Application Priority Data

Oct. 1, 2020  (FR) ......................................  2010031

(51) Int. Cl.
| *B32B 27/08* | (2006.01) |
| *B32B 27/12* | (2006.01) |
| *B32B 27/18* | (2006.01) |
| *B32B 27/34* | (2006.01) |
| *B32B 27/38* | (2006.01) |
| *B32B 27/22* | (2006.01) |

(52) U.S. Cl.
CPC .............. *B32B 27/08* (2013.01); *B32B 27/12* (2013.01); *B32B 27/18* (2013.01); *B32B 27/34* (2013.01); *B32B 27/38* (2013.01); *B32B 27/22* (2013.01); *B32B 2260/021* (2013.01); *B32B 2260/023* (2013.01); *B32B 2260/046* (2013.01); *B32B 2262/101* (2013.01); *B32B 2262/106* (2013.01); *B32B 2270/00* (2013.01); *B32B 2305/10* (2013.01); *B32B 2307/306* (2013.01); *B32B 2307/7242* (2013.01); *B32B 2439/40* (2013.01); *B32B 2605/00* (2013.01); *Y02E 60/32* (2013.01)

(58) Field of Classification Search
CPC ......... B32B 27/08; B32B 27/12; B32B 27/36; B32B 27/38; B32B 37/153; B32B 2262/101; B32B 2305/10; B32B 2307/306; B32B 2457/10; B32B 2605/00; B32B 27/18; B32B 2260/021; B32B 2260/023; B32B 2260/046; B32B 2262/0253; B32B 2262/0269; B32B 2262/04; B32B 2262/065; B32B 2262/08; B32B 2262/106; B32B 2262/14; B32B 2270/00; B32B 2307/30; B32B 2307/7242; B32B 2439/40; B32B 5/02; B32B 5/024; B32B 5/26; B32B 25/14; B32B 27/22; B32B 27/34; B32B 27/32; B32B 27/20; C08L 77/00; C08L 2205/03; Y02E 60/32

See application file for complete search history.

(56) References Cited

U.S. PATENT DOCUMENTS

| 5,360,888 | A |  | 11/1994 | Ullrich |  |
| 11,377,536 | B2 |  | 7/2022 | Blondel et al. |  |
| 2014/0034654 | A1 | * | 2/2014 | Dullaert | .................. C08L 77/06 524/451 |
| 2017/0313843 | A1 | * | 11/2017 | Blondel | .................. B32B 27/32 |
| 2018/0290537 | A1 | * | 10/2018 | Ueda | ..................... B29C 53/005 |
| 2019/0375182 | A1 |  | 12/2019 | Kanesugi et al. |  |

FOREIGN PATENT DOCUMENTS

| EP | 0342066 | A1 |   | 11/1989 |
| EP | 1505099 | A2 |   | 2/2005 |
| EP | 3112421 | A1 |   | 1/2017 |
| EP | 3309438 | A1 |   | 4/2018 |
| EP | 3587882 | A1 |   | 1/2020 |
| FR | 3027907 | A1 |   | 5/2016 |
| GB | 2489610 | A |   | 10/2012 |
| JP | 2007162830 | A | * | 6/2007 |
| JP | 2014513250 | A |   | 5/2014 |
| JP | 2017003105 | A |   | 1/2017 |
| JP | 2018502206 | A |   | 1/2018 |
| WO | 2016080151 | A1 |   | 5/2016 |
| WO | 2016136025 | A1 |   | 9/2016 |
| WO | 2017057516 | A1 |   | 4/2017 |
| WO | 2018155491 | A1 |   | 8/2018 |

OTHER PUBLICATIONS

Galassi, M.C., et al., "Onboard Compressed Hydrogen Storage: Fast Filling Experiments and Simulations", Energy Procedia, 2012 (month unknown), pp. 192-200, vol. 29. (9 pages).
International Search Report (PCT/ISA/210) and Written Opinion (PCT/ISA/237) mailed on Jan. 12, 2022 by the European Patent Office as the International Searching Authority for International Application No. PCT/FR2021/051665. (14 pages).

(Continued)

*Primary Examiner* — John D Freeman
(74) *Attorney, Agent, or Firm* — Boone IP Law

(57) ABSTRACT

Multi-layer structure intended for storing hydrogen, including, from the inside out, a sealing layer and a composite reinforcing layer, the innermost composite reinforcing layer being wound around the outermost adjacent sealing layer, at least the innermost sealing layer being made of a composition including: a. 20.5 to 99.845% by weight of a polyamide; b. 0.005 to 0.5% by weight of a catalyst; c. 0.05 to 1% by weight of a heat stabilizer; d. 0.1 to 3% by weight of a oligo- or poly-carbodiimide; e. 0 to 1.5% by weight of a plasticiser; f. 0 to less than 15% by weight of a polyolefin; g. 0 to 30% of an additive, and at least one of the composite reinforcing layers of a fibrous material in the form of continuous fibres impregnated with a composition including at least one polymer P2j, j=1 to m, m being the number of reinforcing layers.

18 Claims, No Drawings

(56) References Cited

OTHER PUBLICATIONS

Office Action with English Translation, issued on Apr. 18, 2025, by Japanese Patent Office (JPO) in related Japanese Case No. 2023520125, 15 pages.

* cited by examiner

MULTI-LAYER STRUCTURE FOR STORING HYDROGEN

TECHNICAL FIELD

The present patent application relates to multilayer composite structures for storing hydrogen and the method for making them.

PRIOR ART

Hydrogen tanks are currently attracting a lot of attention from numerous manufacturers, especially in the automotive sector. One of the goals sought is to propose increasingly fewer polluting vehicles. Thus, electric or hybrid vehicles comprising a battery aim to progressively replace combustion engine vehicles such as either gas or diesel vehicles. It has turned out that the battery is a relatively complex vehicle component. Depending on the positioning of the battery in the vehicle, it may be necessary to protect it from impact and from the outside environment, which can have extreme temperatures and variable humidity. It is also necessary to avoid any risk of flames.

Additionally, it is important that the operating temperature thereof not exceed 55° C. in order to not break down the cells of the battery and to preserve the life thereof. Conversely, for example in winter, it may be necessary to increase the battery temperature so as to optimize operation thereof.

Moreover, electric vehicles still suffer today from several problems, namely battery range, the use in these batteries of rare earth metals, the resources for which are not infinite, much longer recharging times than the length of time taken to fill a tank, as well as a problem of electricity production in various countries in order to be able to recharge the batteries.

Hydrogen is therefore an alternative to the electric battery, since hydrogen can be converted into electricity by means of a fuel cell and thus power electric vehicles.

Hydrogen tanks usually consist of a metallic liner (or sealing layer) that must prevent hydrogen from permeating out. One of the types of tank envisaged, referred to as Type IV, is based on a thermoplastic liner around which a composite is wound.

Their basic principle is to separate the two essential functions of sealing and mechanical strength and manage them independently of each other. In this type of tank, the liner (or sealing sheath) made of thermoplastic resin is combined with a reinforcement structure consisting of fibers (glass, aramid, carbon), also known as a reinforcement sheath or layer, which makes it possible to operate at much higher pressures while reducing weight and avoiding risks of explosive rupture in the event of severe external attacks.

The liners must have certain fundamental characteristics:
  The possibility to be transformed by extrusion blow molding, rotational molding or injection molding.
  Low permeability to hydrogen, indeed, the permeability of the liner is a key factor in limiting hydrogen losses from the tank;
  Good mechanical properties (fatigue) at low temperatures (−40 to −70° C.);
  Thermal resistance at 120° C.

Indeed, it is necessary to increase the filling speed of the hydrogen tank, which should be roughly equivalent to that of a fuel tank for an internal combustion engine (about 3 to 5 minutes), but this increase in speed causes more significant heating of the tank, which then reaches a temperature of about 100° C.

The assessment of the performance and safety of hydrogen tanks can be determined in a reference European laboratory (GasTeF: hydrogen tank testing facility), as described in Galassi et al. (World hydrogen energy conference 2012, Onboard compressed hydrogen storage: fast filing experiments and simulations, Energy Procedia 29, (2012) 192-200).

The first generation of type IV tanks used a liner based on high-density polyethylene (HDPE).

However, HDPE has the disadvantage of having too low a melting point and high permeability to hydrogen, which represents a problem with new requirements in terms of thermal resistance and does not make it possible to increase the filling speed of the tank.

Liners based on polyamide PA6 have been in development for a number of years.

Nonetheless, PA6 has the disadvantage of having a low resistance to cold.

WO2018155491 describes a hydrogen transport component having a three-layer structure, the inner layer of which is a composition consisting of PA11, from 15 to 50% of an impact modifier and from 1 to 3% of plasticizer, or devoid of plasticizer, and which has hydrogen barrier properties, good flexibility, and durability at low temperature. However, this structure is suitable for pipes for the transport of hydrogen but not for the storage of hydrogen and, moreover, this composition has an excessively variable viscosity to be stable upon transformation by extrusion blow molding, which is a transformation technology that can generate very high melt residence times (up to 20 minutes) at high temperature within the accumulating blocks.

Thus, there is still a need to optimize, on the one hand, the matrix of the composite so as to optimize its mechanical strength at high temperature and, on the other hand, the material composing the sealing sheath, so as to optimize its operating temperature. Thus, the optional modification of the composition of the material composing the sealing liner which will be carried out must not result in a significant increase in the manufacturing temperature (extrusion blow molding, injection molding, rotational molding, etc.) of this liner compared to what is practiced today.

These problems are solved by providing a multilayer structure of the present invention intended for storing hydrogen.

Throughout this description, the terms "liner" and "sealing sheath" have the same meaning.

The present invention thus relates to a multilayer structure intended for storing hydrogen, comprising, from the inside to the outside, at least one sealing layer (1) and at least one composite reinforcing layer (2),
  said innermost composite reinforcing layer being wound around said outermost adjacent sealing layer (1),
  at least said innermost sealing layer consisting of a composition comprising, relative to the total weight of the composition:
  a. 20.5 to 99.845% by weight of at least one polyamide;
  b. 0.005 to 0.5% by weight of at least one catalyst;
  c. 0.05 to 1% by weight of at least one thermal stabilizer;
  d. 0.1 to 3% by weight of at least one oligo- or polycarbodiimide;
  e. 0 to 1.5% by weight of at least one plasticizer,
  f. 0 to less than 15% by weight of at least one polyolefin;
  g. 0 to 30% of at least one additive,
  the sum of the constituents a to g being 100% by weight, and at least one of said composite reinforcing layers consisting of a fibrous material in the form of continuous fibers which are impregnated with a composition predominantly comprising at least one polymer P2j, j=1 to m, m being the number of reinforcing layers, in particular an epoxy resin or epoxy-based resin.

Advantageously, said structure is devoid of nucleating agent.

Advantageously, said structure is devoid of an outermost layer adjacent to the outermost layer of polyamide polymer composite reinforcing.

Advantageously, said structure is devoid of nucleating agent and devoid of an outermost layer adjacent to the outermost layer of polyamide polymer composite reinforcing.

The inventors have therefore found, unexpectedly, that the use of a long-chain semi-crystalline polyamide thermoplastic polymer, comprising a limited proportion of impact modifier and plasticizer, a catalyst, a thermal stabilizer and an oligo- or poly-carbodiimide made it possible not only to obtain compositions for the sealing layer which have good viscosities, that is to say viscosities in the melt state that are sufficiently high to be able to be transformed, in particular by extrusion blow molding, without however increasing the viscosity in solution, in other words the inherent viscosity, said melt viscosity being moreover sufficiently stable during transformation, in particular for extrusion blow molding. They also found that the combination of said sealing layer with a different polymer for the matrix of the composite, and especially an epoxy resin or epoxy-based resin, said composite being wound around the sealing layer, also made it possible to obtain a structure suitable for storing hydrogen and especially an increase in the maximum temperature of use that can extend up to 120° C., thus making it possible to increase the filling speed of tanks.

By "multilayer structure" a tank comprising or consisting of several layers should be understood, namely several sealing layers and several reinforcement layers, or one sealing layer and several reinforcement layers, or several sealing layers and a reinforcement layer or a sealing layer and a reinforcement layer.

The multilayer structure is therefore understood to exclude a pipe or a tube.

In one embodiment, said multilayer structure consists of two layers, a sealing layer and a reinforcement layer.

The sealing layer or layers are the innermost layers compared to the composite reinforcing layers, which are the outermost layers.

The tank may be a tank for the mobile storage of hydrogen, that is on a truck for transporting hydrogen, on a car for transporting hydrogen and for supplying a fuel cell with hydrogen, for example, on a train for supplying hydrogen or on a drone for supplying hydrogen, but it can also be a tank for the stationary storage of hydrogen in a station for distributing hydrogen to vehicles.

Advantageously, the sealing layer (1) is leaktight to hydrogen at 23° C., i.e., the permeability to hydrogen at 23° C. is less than 500 cc·mm/m2·24 h·atm at 23° C. under 0% relative humidity (RH).

The composite reinforcing layer(s) is (are) wound around the sealing layer by means of ribbons (or tapes or rovings) of fibers impregnated with polymer, which are deposited for example by filament winding.

When several layers are present, the polymers are different.

When the polymers of the reinforcement layers are identical, several layers may be present, but advantageously a single reinforcement layer is present which then has at least one full winding around the sealing layer.

This entirely automatic process which is well known to those skilled in the art makes it possible, layer by layer, to select the winding angles which will afford the final structure its ability to withstand internal pressure changes.

When several sealing layers are present, only the innermost of the sealing layers is in direct contact with the hydrogen.

When only one sealing layer and a composite reinforcement layer are present, thus leading to a two-layer multilayer structure, then these two layers can adhere to one another, in direct contact with one another, especially because of the winding of the composite reinforcement layer over the sealing layer.

When several sealing layers and/or several composite reinforcing layers are present, then the outermost layer of said sealing layers, and thus the one opposite the layer in contact with the hydrogen, may or may not adhere to the innermost layer of said composite reinforcement.

The other composite reinforcement layers also may or may not adhere to one another.

The other sealing layers also may or may not adhere to one another.

Advantageously, only one sealing layer and one reinforcement layer are present, and do not adhere to one another.

Advantageously, only one sealing layer and one reinforcing layer are present, and do not adhere to one another, and the reinforcing layer consists of a fibrous material in the form of continuous fibers which are impregnated with a composition predominantly comprising at least one polymer P2j, in particular an epoxy resin or an epoxy-based resin.

In one embodiment, only one sealing layer and one reinforcing layer are present, and do not adhere to one another, and the reinforcing layer consists of a fibrous material in the form of continuous fibers which are impregnated with a composition predominantly comprising a polymer P2j which is an epoxy resin or an epoxy-based resin.

The expression "epoxy-based" throughout the description means that the epoxy represents at least 50% by weight of the matrix.

Regarding the Sealing Layer(s) and the Composition

One or more sealing layers may be present.

From 1 to 10 layers may be present, in particular from 1 to 5, particularly from 1 to 3, preferentially only 1 sealing layer is present.

At least said innermost sealing layer consists of a composition comprising, relative to the total weight of the composition:
   a. 20.5 to 99.845% by weight of at least one polyamide;
   b. 0.005 to 0.5% by weight of at least one catalyst;
   c. 0.05 to 1% by weight of at least one thermal stabilizer;
   d. 0.1 to 3% by weight of at least one oligo- or poly-carbodiimide;
   e. 0 to 1.5% by weight of at least one plasticizer,
   f. 0 to less than 15% by weight of at least one polyolefin;
   g. 0 to 30% of at least one additive,
   the sum of the constituents a to g being 100% by weight.

In one embodiment, said composition consists of:
   a. 20.5 to 99.845% by weight of at least one polyamide;
   b. 0.005 to 0.5% by weight of at least one catalyst;
   c. 0.05 to 1% by weight of at least one thermal stabilizer;
   d. 0.1 to 3% by weight of at least one oligo- or poly-carbodiimide;
   e. 0 to 1.5% by weight of at least one plasticizer,
   f. 0 to less than 15% by weight of at least one polyolefin;
   g. 0 to 30% of at least one additive,
   the sum of the constituents a to g being 100% by weight.

The Catalyst:

The term "catalyst" denotes a polycondensation catalyst such as a mineral or organic acid.

The proportion by weight of catalyst is from approximately 50 ppm to approximately 5000 ppm, in particular from approximately 100 to approximately 3000 ppm relative to the total weight of the composition.

Advantageously, the catalyst is chosen from phosphoric acid (H3PO4), phosphorous acid (H3PO3), hypophosphorous acid (H3PO2), or a mixture thereof.

Advantageously, the proportion by weight of catalyst is from approximately 50 ppm to approximately 5000 ppm, in particular from approximately 100 to approximately 3000 ppm relative to the total weight of the composition and said catalyst is selected from phosphoric acid (H3PO4), phosphorous acid (H3PO3), hypophosphorous acid (H3PO2), or a mixture thereof.

Advantageously, the catalyst is selected from phosphoric acid (H3PO4), phosphorous acid (H3PO3) in a proportion of from approximately 100 to approximately 3000 ppm.

The Thermal Stabilizer:

This stabilizer may be an organic stabilizer or more generally a combination of organic stabilizers, such as a primary phenol antioxidant (for example of the type Irganox 245 or 1098 or 1010 by Ciba), a secondary phosphite antioxidant and even optionally other stabilizers such as a HALS, which means hindered amine light stabilizer (for example Tinuvin 770 by Ciba), a phenol phosphite antioxidant such as ANOX®NDB TL89, an anti-UV (for example Tinuvin 312 by Ciba), a phenolic or phosphorus-based stabilizer. Amine antioxidants such as Crompton's Naugard 445 or even polyfunctional stabilizers such as Clariant's Nylostab S-EED may also be used.

This stabilizer may also be a mineral stabilizer, such as a copper-based stabilizer. By way of example of such mineral stabilizers, mention may be made of halides and copper acetates. Secondarily, other metals such as silver may optionally be considered, but these are known to be less effective. These copper-based compounds are typically associated with alkali metal halides, particularly potassium.

Advantageously, the thermal stabilizer is an organic stabilizer.

The thermal stabilizer is in a proportion from approximately 0.05% to approximately 1%, in particular from approximately 0.05% to approximately 0.3% by weight relative to the total weight of the composition.

Advantageously, the proportion by weight of catalyst is from approximately 50 ppm to approximately 5000 ppm, in particular from approximately 100 to approximately 3000 ppm relative to the total weight of the composition, the thermal stabilizer is in a proportion from approximately 0.05% to approximately 1%, in particular from approximately 0.05% to approximately 0.3% by weight relative to the total weight of the composition, and said catalyst is selected from phosphoric acid (H3PO4), phosphorous acid (H3PO3), hypophosphorous acid (H3PO2), or a mixture thereof.

Advantageously, the catalyst is selected from phosphoric acid (H3PO4), phosphorous acid (H3PO3) in a proportion of from approximately 100 to approximately 3000 ppm.

The Carbodiimide:

The carbodiimide represents a carbodiimide polymer and oligomer conventionally known and can be prepared by polymerization of diisocyanates.

This reaction can be accelerated by catalysts and products with elimination of carbon dioxide (J. Org. Chem, 28, 2069 (1963). J. Am. Chem. Soc. 84, 3673 (1962); Chem. Rev., 81, 589 (1981); Ange. Chem., 93, 855 (1981)).

The reagents of the NCO end groups may comprise a CH, NH or OH reactive compound, for example esters of malonic acid, caprolactam, alcohols or phenols.

Alternatively, mixtures of monoisocyanates and diisocyanates may be polymerized to obtain oligo- or poly-carbodiimides containing substantially non-reactive end groups.

The carbodiimide used is an oligo- or poly-carbodiimide of general formula:

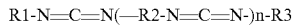

R1—N=C=N(—R2—N=C=N—)n-R3 wherein R1 and R3 represent C1-C20 alkyls, C5-C20 cycloalkyls, aryls having from 6 to 20 carbon atoms or aralkyls having from 7 to 20 carbon atoms, each being optionally substituted with an isocyanate group optionally comprising a CH, NH or an OH reactive compound;

R2 represents an alkylene group having 2 to 20 carbon atoms, cycloalkylene group having 5 to 20 carbon atoms, arylene group having 6 to 20 carbon atoms or aralkylene group having 7 to 20 carbon atoms;

n=1 to 100, preferably 2 to 80 and preferably 3 to 70.

The oligo- or poly-carbodiimide may be a homopolymer or a copolymer, for example a copolymer of 2,4-diisocyanato-1,3,5-triisopropylbenzene and 1,3-diisocyanato-3,4-diisopropylbenzene.

The oligo- or poly-carbodiimide can also be selected from those described in U.S. Pat. No. 5,360,888.

Suitable oligo and poly-carbodiimides can be obtained from commercially available sources such as Rhein Chemie, Raschig or Ziko.

Advantageously, the proportion by weight of oligo- or poly-carbodiimide used is from approximately 0.1 to approximately 3%, in particular from 0.5 to 2%, particularly approximately equal to 1% relative to the total weight of the composition.

Advantageously, the oligo- or poly-carbodiimide is selected from Stabilizers, in particular Stabilizer®9000, Stabaxols®, particularly a Stabaxol® P, in particular Stabaxol® P100 or Stabaxol® P400, or a mixture thereof.

Advantageously, the present invention therefore relates to the structure defined above comprising an innermost sealing layer consisting of a composition comprising, relative to the total weight of the composition, at least one catalyst, at least one thermal stabilizer, and at least one oligo- or poly-carbodiimide in a proportion from approximately 0.1 to approximately 3%, in particular from 0.5 to 2%, particularly approximately equal to 1% by weight relative to the total weight of the composition, with a matrix comprising at least one thermoplastic polymer, particularly a polyamide, said oligo- or poly-carbodiimide being selected from a Stabilizer, in particular Stabilizer®9000, a Stabaxol®, particularly a Stabaxol® P, in particular Stabaxol® P100 or Stabaxol® P400, or a mixture thereof, and, where appropriate, at least one plasticizer up to 1.5% by weight and/or at least one polyolefin up to 15% by weight.

Advantageously, the proportion by weight of catalyst is from approximately 50 ppm to approximately 5000 ppm, in particular from approximately 100 to approximately 3000 ppm relative to the total weight of the composition, and the oligo- or poly-carbodiimide is in a proportion from approximately 0.1 to approximately 3%, in particular from 0.5 to 2%, particularly approximately equal to 1% by weight relative to the total weight of the composition, with a matrix comprising at least one thermoplastic polymer, particularly a polyamide, said catalyst being selected from phosphoric acid (H3PO4), phosphorous acid (H3PO3), hypophosphorous acid (H3PO2), or a mixture thereof, and said oligo- or poly-carbodiimide being selected from a Stabilizer, in particular Stabilizer® 9000, a Stabaxol®, particularly a Stabaxol® P, in particular Stabaxol® P100 or Stabaxol® P400, or a mixture thereof.

Advantageously, the catalyst is selected from phosphoric acid (H3PO4), phosphorous acid (H3PO3) in a proportion of from approximately 100 to approximately 3000 ppm.

Advantageously, the thermal stabilizer is in a proportion from approximately 0.05% to approximately 1%, in particular from approximately 0.05% to approximately 0.3% by weight relative to the total weight of the composition, and the oligo- or poly-carbodiimide is in a proportion from approximately 0.1 to approximately 3%, in particular from 0.5 to 2%, particularly approximately equal to 1% by weight relative to the total weight of the composition, and said oligo- or poly-carbodiimide being selected from a Stabilizer, in particular Stabilizer® 9000, a Stabaxol®, particularly a Stabaxol® P, in particular Stabaxol® P100 or Stabaxol® P400, or a mixture thereof.

Advantageously, the proportion by weight of catalyst is from approximately 50 ppm to approximately 5000 ppm, in particular from approximately 100 to approximately 3000 ppm relative to the total weight of the composition, the thermal stabilizer is in a proportion from approximately 0.05% to approximately 1%, in particular from approximately 0.05% to approximately 0.3% by weight relative to the total weight of the composition, and the oligo- or poly-carbodiimide is in a proportion from approximately 0.1 to approximately 3%, in particular from 0.5 to 2%, particularly approximately equal to 1% by weight relative to the total weight of the composition, said catalyst being selected from phosphoric acid (H3PO4), phosphorous acid (H3PO3), hypophosphorous acid (H3PO2), or a mixture thereof, and said oligo- or poly-carbodiimide being selected from a Stabilizer, in particular Stabilizer® 9000, a Stabaxol®, particularly a Stabaxol® P, in particular Stabaxol® P100 or Stabaxol® P400, or a mixture thereof.

Advantageously, the catalyst is selected from phosphoric acid (H3PO4), phosphorous acid (H3PO3) in a proportion of from approximately 100 to approximately 3000 ppm.

Additives:

The additives may be selected from another polymer, a UV absorber, a light stabilizer, a lubricant, an inorganic filler, a flame retardant, a dye, carbon black and carbonaceous nanofillers, with the exception of a nucleating agent, in particular, the additives are selected from a UV absorber, a light stabilizer, a lubricant, an inorganic filler, a flame retardant, a dye, carbon black and carbonaceous nanofillers, with the exception of a nucleating agent.

Said other polymer may be another semi-crystalline thermoplastic polymer or a different polymer and especially an EVOH (Ethylene vinyl alcohol).

In one embodiment, a single polyamide is present in at least the sealing layer that does not adhere to the composite reinforcing layer.

Polyamide

The polyamide is in particular a semi-crystalline, particularly aliphatic or semi-aromatic, polyamide, in particular aliphatic, polyamide.

Semi-crystalline polyamide refers to a material that is generally solid at ambient temperature and that softens during a temperature increase, in particular after passing its glass transition temperature (Tg), and may exhibit a sharp transition upon passing what is referred to as its melting point (Tm), and which becomes solid again when the temperature decreases below its crystallization temperature.

The Tg, the Tc and the Tm are determined by differential scanning calorimetry (DSC) according to standard 11357-2:2013 and 11357-3:2013, respectively.

The number-average molecular weight Mn of said semi-crystalline polyamide is preferably in a range extending from 10,000 to 85,000, especially from 10,000 to 60,000, preferentially from 10,000 to 50,000, even more preferentially from 12,000 to 50,000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

The nomenclature used to define the polyamides is described in ISO standard 1874-1:2011 "Plastiques—Matériaux polyamides (PA) pour moulage et extrusion—Partie 1: Désignation", especially on page 3 (Tables 1 and 2) and is well known to the person skilled in the art.

The polyamide may be a homopolyamide or a co-polyamide or a mixture thereof.

In one embodiment, said polyamide is an aliphatic polyamide, particularly a long-chain aliphatic polyamide, that is to say a polyamide having an average number of carbon atoms per nitrogen atom of greater than 8.5, preferably greater than 9, in particular greater than 10.

In particular, the long-chain aliphatic polyamide is selected from: Polyamide 10 (PA10), polyamide 11 (PA11), polyamide 12 (PA12), polyamide 1010 (PA1010), polyamide 1012 (PA1012), polyamide 1212 (PA1012), or a mixture thereof or a copolyamide thereof, in particular PA11 and PA12.

More particularly, polyamide 11 (PA11), polyamide 12 (PA12), polyamide 1012 (PA1012), polyamide 1212 (PA1012), or a mixture thereof or a copolyamide thereof, in particular PA11 and PA12.

In one embodiment, the long-chain aliphatic polyamide is selected from: polyamide 12 (PA12), polyamide 1010 (PA1010), polyamide 1012 (PA1012), polyamide 1212 (PA1012), or a mixture thereof or a copolyamide thereof, in particular PA12.

In another embodiment, the long-chain aliphatic polyamide is selected from:

polyamide 12 (PA12), polyamide 1012 (PA1012), polyamide 1212 (PA1012), or a mixture thereof or a copolyamide thereof, in particular PA12.

In another embodiment, said semi-crystalline polyamide thermoplastic polymer is a semi-aromatic semi-crystalline polyamide, particularly a long-chain semi-aromatic semi-crystalline polyamide, that is to say a polyamide having an average number of carbon atoms per nitrogen atom greater than 8.5, preferably greater than 9, in particular greater than 10, and a melting point from 240° C. to less than 280° C.

In particular, the long-chain semi-aromatic semi-crystalline polyamide is chosen from polyamide 11/5T or 11/6T or the 11/10T, the MXDT/10T. The <PMDT/10T and the BACT/10T.

Advantageously, each sealing layer consists of a composition comprising the same type of polyamide.

In the event that welding is necessary, there are various methods making it possible to weld elements made of polyamide thermoplastic polymer. Thus, contact or contactless heating blades, ultrasound, infrared, vibrations, rotation of one element to be welded against the other or even laser welding may be used.

Regarding the Polyolefin

In one embodiment, PEBAs are excluded from the definition of polyolefins.

The polyolefin can be functionalized or non-functionalized or be a mixture of at least one functionalized and/or least one non-functionalized polyolefin. To simplify, the polyolefin is denoted (B) and functionalized polyolefins (B1) and non-functionalized polyolefins (B2) are described below.

A non-functionalized polyolefin (B2) is classically a homopolymer or copolymer of alpha-olefins or diolefins, such as for example, ethylene, propylene, 1-butene, 1-octene, butadiene. By way of example, mention may be made of:
- homopolymers and copolymers of polyethylene, in particular LDPE, HDPE, LLDPE (linear low-density polyethylene), VLDPE (very low density polyethylene) and metallocene polyethylene.
- homopolymers or copolymers of propylene.
- ethylene/alpha-olefin copolymers such as ethylene/propylene, EPR (abbreviation for ethylene-propylene-rubber) and ethylene/propylene/diene (EPDM).
- styrene/ethylene-butene/styrene (SEBS), styrene/butadiene/styrene (SBS), styrene/isoprene/styrene (SIS), styrene/ethylene-propylene/styrene (SEPS) block copolymers.
- copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

The functionalized polyolefin (B1) may be a polymer of alpha-olefins having reactive units (functionalities); such reactive units are acid, anhydride, or epoxy functions. By way of example, mention may be made of the preceding polyolefins (B2) grafted or co- or ter-polymerized by unsaturated epoxides such as glycidyl (meth)acrylate, or by carboxylic acids or the corresponding salts or esters such as (meth)acrylic acid (which can be completely or partially neutralized by metals such as Zn, etc.) or even by carboxylic acid anhydrides such as maleic anhydride. A functionalized polyolefin is for example a PE/EPR mixture, the ratio by weight whereof can vary widely, for example between 40/60 and 90/10, said mixture being co-grafted with an anhydride, especially maleic anhydride, according to a graft rate for example of 0.01 to 5% by weight.

The functionalized polyolefin (B1) may be chosen from the following, maleic anhydride or glycidyl methacrylate grafted, (co)polymers wherein the graft rate is for example from 0.01 to 5% by weight:
- of PE, of PP, of copolymers of ethylene with propylene, butene, hexene, or octene containing for example from 35 to 80% by weight of ethylene;
- ethylene/alpha-olefin copolymers such as ethylene/propylene, EPRs (abbreviation for ethylene-propylene-rubber) and ethylene/propylene/diene (EPDM).
- styrene/ethylene-butene/styrene (SEBS), styrene/butadiene/styrene (SBS), styrene/isoprene/styrene (SIS), styrene/ethylene-propylene/styrene (SEPS) block copolymers.
- ethylene and vinyl acetate copolymers (EVA), containing up to 40% by weight of vinyl acetate;
- ethylene and alkyl (meth)acrylate copolymers, containing up to 40% by weight of alkyl (meth)acrylate;
- ethylene and vinyl acetate (EVA) and alkyl (meth)acrylate copolymers, containing up to 40% by weight of comonomers.

The functionalized polyolefin (B1) may also be selected from ethylene/propylene copolymers with predominantly maleic anhydride grafted propylene then condensed with a mono-amine polyamide (or a polyamide oligomer) (products described in EP-A-0,342,066).

The functionalized polyolefin (B1) may also be a co- or terpolymer of at least the following units: (1) ethylene, (2) alkyl (meth)acrylate or vinyl ester of saturated carboxylic acid and (3) anhydride such as maleic anhydride or (meth)acrylic acid or epoxy such as glycidyl (meth)acrylate.

By way of example of functionalized polyolefins of the latter type, mention may be made of the following copolymers, where ethylene represents preferably at least 60% by weight and where the termonomer (the function) represents for example from 0.1 to 10% by weight of the copolymer:
- ethylene/alkyl (meth)acrylate/(meth)acrylic acid or maleic anhydride or glycidyl methacrylate copolymers;
- ethylene/vinyl acetate/maleic anhydride or glycidyl methacrylate copolymers;
- ethylene/vinyl acetate or alkyl (meth)acrylate/(meth) acrylic acid or maleic anhydride or glycidyl methacrylate copolymers.

In the preceding copolymers, (meth)acrylic acid can be salified with Zn or Li.

The term "alkyl (meth)acrylate" in (B1) or (B2) denotes C1 to C8 alkyl methacrylates and acrylates, and may be chosen from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as a diacid, dianhydride, diepoxy, etc. that can react with these or mixtures of at least two functionalized polyolefins that can react together.

The copolymers mentioned above, (B1) and (B2), may be copolymerized in a statistical or sequenced way and have a linear or branched structure.

The molecular weight, the index MFI, the density of these polyolefins may also vary widely, which the person skilled in the art will know. MFI, abbreviation for Melt Flow Index, is a measure of fluidity in the molten state. It is measured according to standard ASTM 1238.

Advantageously the non-functionalized polyolefins (B2) are selected from homopolymers or copolymers of polypropylene and any ethylene homopolymer or ethylene copolymer and a higher alpha-olefin comonomer such as butene, hexene, octene or 4-methyl-1-pentene. Mention may be made for example of PPs, high-density PEs, medium-density PEs, linear low-density PEs, low-density PEs, very low-density PEs. These polyethylenes are known by the person skilled in the art as being produced according to a "free-radical" method, according to a "Ziegler" catalysis method, or, more recently, a so-called "metallocene" catalysis.

Advantageously the functionalized polyolefins (B1) are chosen from any polymer comprising alpha-olefin units and units carrying polar reactive functions like epoxy, carboxylic acid or carboxylic acid anhydride functions. By way of examples of such polymers, mention may be made of terpolymers of ethylene, of alkyl acrylate and of maleic anhydride or of glycidyl methacrylate such as Lotader® from the Applicant or polyolefins grafted with maleic anhydride such as Orevac® from SK Chemicals and also terpolymers of ethylene, of alkyl acrylate and of (meth)acrylic acid. Mention may also be made of homopolymers or copolymers of polypropylene grafted by a carboxylic acid anhydride then condensed with polyamides or monoamine polyamide oligomers.

Advantageously, said composition constituting said sealing layer(s) is devoid of polyether block amide (PEBA). In this embodiment, PEBAs are therefore excluded from the polyolefins.

Regarding the Plasticizer:

The plasticizer may be a plasticizer commonly used in compositions based on polyamide(s).

Advantageously, use is made of a plasticizer which has good thermal stability so that it does not form fumes during the steps of mixing the different polymers and transforming the composition obtained.

In particular, this plasticizer may be selected from:
benzenesulfonamide derivatives, such as n-butyl benzenesulfonamide (BBSA), the ortho and para isomers of ethyl toluenesulfonamide (ETSA), N-cyclohexyl toluenesulfonamide and N-(2-hydroxypropyl)benzenesulfonamide (HP-BSA),
esters of hydroxybenzoic acids, such as 2-ethylhexyl para-hydroxybenzoate (EHPB) and 2-decylhexyl para-hydroxybenzoate (HDPB),
esters or ethers of tetrahydrofurfuryl alcohol, such as oligoethyleneoxytetrahydrofurfuryl alcohol, and
esters of citric acid or hydroxymalonic acid, such as oligoethyleneoxymalonate.

A preferred plasticizer is n-butyl benzenesulfonamide (BBSA).

Another, more particularly preferred plasticizer is N-(2-hydroxypropyl)benzenesulfonamide (HP-BSA). Indeed, the latter has the advantage of preventing the formation of deposits at the extrusion screw and/or die ("die drool") during a step of transformation by extrusion.

Of course, it is possible to use a mixture of plasticizers.

In one embodiment, said composition of said at least one innermost sealing layer comprises at least one polyolefin, in a proportion of 1% to less than 15% by weight, in particular of 1% to 12% by weight, particularly of 1% to 10% by weight, relative to the total weight of the composition.

In one embodiment, said composition is devoid of plasticizer.

In one embodiment, said composition of said at least one innermost sealing layer comprises at least one polyolefin, in a proportion of 1% to less than 15% by weight, in particular of 1% to 12% by weight, particularly of 1% to 10% by weight, relative to the total weight of the composition, and said composition is devoid of plasticizer.

In yet another embodiment, said composition of said at least one innermost sealing layer comprises at least one polyolefin, in a proportion of 1% to less than 15% by weight, in particular of 1% to 12% by weight, particularly of 1% to 10% by weight, relative to the total weight of the composition, and from 0.1 to 1.5% by weight of plasticizer, relative to the total weight of the composition.

Regarding the Composite Reinforcement Layer and the Polymer P2j

The polymer P2j can be a thermoplastic polymer or a thermoset polymer.

One or more composite reinforcement layers may be present.

Each of said layers consists of a fibrous material in the form of continuous fibers impregnated with a composition predominantly comprising at least one thermoplastic polymer P2j, j corresponding to the number of layers present.

j is comprised from 1 to 10, in particular from 1 to 5, especially from 1 to 3, preferentially j=1.

The term "predominantly" means that said at least one polymer is present at more than 50% by weight relative to the total weight of the composition and of the matrix of the composite.

Advantageously, said at least one predominant polymer is present at more than 60% by weight, especially at more than 70% by weight, particularly at more than 80% by weight, more particularly greater than or equal to 90% by weight, relative to the total weight of the composition.

Said composition may further comprise impact modifiers and/or additives.

Impact Modifiers

The impact modifiers advantageously consist of a polymer having a flexural modulus below 100 MPa measured according to standard ISO 178 and a Tg below 0° C. (measured according to standard 11357-2 at the inflection point of the DSC thermogram), in particular a polyolefin.

The polyolefin is as defined above.

The additives of said composition of the composite reinforcing layer may be selected from an antioxidant, a heat stabilizer, a UV absorber, a light stabilizer, a lubricant, an inorganic filler, a flame retardant, a plasticizer and a dye, with the exception of a nucleating agent.

Advantageously, said composition predominantly consists of said thermoplastic polymer P2j, from 0 to 15% by weight of impact modifier, in particular from 0 to 12% by weight of impact modifier, from 0 to 5% by weight of additives, the sum of the constituents of the composition being equal to 100% by weight.

Said at least one predominant polymer in each layer may be the same or different.

In one embodiment, a single predominant polymer is present at least in the composite reinforcement layer and does not adhere to the sealing layer.

In one embodiment, each reinforcement layer comprises the same type of polymer, in particular an epoxy resin or epoxy-based resin.

Polymer P2j

Thermoplastic Polymer P2j

Thermoplastic, or thermoplastic polymer, refers to a material that is generally solid at ambient temperature, which may be semi-crystalline or amorphous, in particular semi-crystalline, and that softens during a temperature increase, in particular after passing its glass transition temperature (Tg) and flows at a higher temperature when it is amorphous, or that may exhibit a sharp transition upon passing its so-called melting point (Tm) when it is semi-crystalline, and which becomes solid again when the temperature decreases below its crystallization temperature Tc, (for a semi-crystalline) and below its glass transition temperature (for an amorphous).

The Tg, Tc, and Tm are determined by differential scanning calorimetry (DSC) according to standard 11357-2:2013 and 11357-3:2013, respectively.

The number-average molecular weight Mn of said thermoplastic polymer, when it corresponds to a polyamide, is preferably in a range extending from 10,000 to 40,000, preferably from 10,000 to 30,000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Examples of suitable semi-crystalline thermoplastic polymers in the present invention include:
- polyamides, in particular comprising an aromatic and/or cycloaliphatic structure, including copolymers, for example polyamide-polyether copolymers, polyesters,
- polyaryletherketones (PAEK),
- polyetheretherketones (PEEK),
- polyetherketoneketones (PEKK),
- polyetherketone etherketone ketones (PEKEKK),
- polyimides, in particular polyetherimides (PEI) or polyamide-imides,
- polylsulfones (PSU), in particular polyarylsulfones such as polyphenylsulfones (PPSU),
- polyethersulfones (PES).

Semi-crystalline polymers are more particularly preferred, and in particular polyamides and their semi-crystalline copolymers.

The nomenclature used to define the polyamides is described in ISO standard 1874-1:2011 "Plastiques—Matériaux polyamides (PA) pour moulage et extrusion—Partie 1: Désignation", especially on page 3 (Tables 1 and 2) and is well known to the person skilled in the art.

The polyamide may be a homopolyamide or a co-polyamide or a mixture thereof.

Advantageously, the semi-crystalline polyamides are semi-aromatic polyamide, especially a semi-aromatic polyamide of formula X/YAr, as described in EP1505099, particularly a semi-aromatic polyamide of formula A/XT wherein A is selected from a unit obtained from an amino acid, a unit obtained from a lactam and a unit corresponding to the formula (Ca diamine)·(Cb diacid), with a representing the number of carbon atoms of the diamine and b representing the number of carbon atoms of the diacid, a and b each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids;
- X·T denotes a unit obtained from the polycondensation of a Cx diamine and terephthalic acid, with x representing the number of carbon atoms of the Cx diamine, x being between 5 and 36, advantageously between 9 and 18, especially a polyamide with formula A/5T, A/6T, A/9T, A/10T, or A/11T, A being as defined above, in particular a polyamide chosen from among a PA MPMDT/6T, a PA11/10T, a PA 5T/10T, a PA 11/BACT, a PA 11/6T/1 T, a PA MXDT/10T, a PA MPMDT/10T, a PA BACT/10T, a PA BACT/6T, PA BACT/10T/6T, a PA 11/BACT/6T, PA 11/MPMDT/6T, PA 11/MPMDT/10T, PA 11/BACT/10T, a PA 11/MXDT/10T, an 11/5T/1 T.

T corresponds to terephthalic acid, MXD corresponds to m-xylylene diamine, MPMD corresponds to methylpentamethylene diamine and BAC corresponds to bis(aminomethyl)cyclohexane. Said semi-aromatic polyamides defined above especially have a Tg of greater than or equal to 80° C.

The expression "stable upon transformation" means that the melt viscosity does not change by more than 70% as a function of time, and specifically between 1 minute (time required to melt the product) and at least 30 minutes, in particular between 1 minute and 30 minutes.

Advantageously, the melt viscosity of said composition of said innermost sealing layer is substantially constant up to 20 minutes.

"Substantially constant" should be understood to mean that the melt viscosity does not change in a proportion of more than 20% up to 20 minutes, between 1 minute and at least 5 minutes, in particular between 1 minute and 5 minutes.

Advantageously, said composition additionally has resistance to thermo-oxidation.

The expression "resistance to thermo-oxidation" is characterized by the half-life (in hours) of the materials. It corresponds to the time after which the ISO 527-2 1 BA specimens, aged in the air at 140° C., have lost half of their initial elongation at break measured according to standard ISO 527-2 (2012).

Advantageously, the resistance to thermo-oxidation is at least 80 days, in particular 100 days.

Advantageously, said composition has a melt viscosity of approximately 13,000 to approximately 23,000 Pa·s, as determined by oscillatory rheology at 270° C. as defined above.

The melt viscosity is determined by oscillatory rheology at 270° C., 10 rad/sec under nitrogen flushing with 5% deformation and 10 sec−1 shear, on a Physica MCR301 apparatus, between two parallel plates 25 mm in diameter.

Inherent viscosity is measured according to standard ISO 307:2007 but in m-cresol instead of sulfuric acid, and the temperature being 20° C.

Thermoset Polymer P2j

The thermoset polymers are selected from epoxy resins or epoxy-based resins, polyesters, vinyl esters and polyurethanes, or a mixture thereof, in particular epoxy resins or epoxy-based resins.

Advantageously, each composite reinforcement layer consists of a composition comprising the same type of polymer, in particular an epoxy resin or epoxy-based resin.

Said composition comprising said polymer P2j can be transparent to radiation suitable for welding.

In another embodiment, the composite reinforcement layer is wound around the sealing layer in the absence of any subsequent welding.

Regarding the Structure

Said multilayer structure therefore comprises a sealing layer and at least one composite reinforcement layer that is wound around the sealing layer and which may or may not adhere to one another.

Advantageously, said sealing layer and reinforcement layers do not adhere to one another and consist of compositions that respectively comprise different polymers.

Nevertheless, said different polymers may be of the same type.

Thus, if one of the two composite reinforcing and sealing layers consists of a composition comprising an aliphatic polyamide, then the other layer consists of a composition comprising a polyamide which is not aliphatic and which is for example a semi-aromatic polyamide so as to have a high-Tg polymer as the matrix of the composite reinforcing.

Said multilayer structure may comprise up to 10 sealing layers and up to 10 composite reinforcing layers of different natures.

It is obvious that said multilayer structure is not necessarily symmetrical and that it may therefore comprise more sealing layers than composite layers or vice versa, but there can be no alternation of layers and reinforcement layer.

Advantageously, said multilayer structure comprises one, two, three, four, five, six, seven, eight, nine or ten sealing layers and one, two, three, four, five, six, seven, eight, nine or ten composite reinforcing layers.

Advantageously, said multilayer structure comprises one, two, three, four or five sealing layers and one, two, three, four or five composite reinforcing layers.

Advantageously, said multilayer structure comprises one, two or three sealing layers and one, two, or three composite reinforcing layers.

Advantageously, they consist of compositions which respectively comprise different polymers.

Advantageously, they consist of compositions that respectively comprise polyamides, in particular semi-crystalline polyamides, particularly aliphatic or aromatic polyamides, and an epoxy or epoxy-based resin P2j.

In one embodiment, said multilayer structure comprises a single sealing layer and several reinforcement layers, said adjacent reinforcement layer being wound around said sealing layer and the other reinforcement layers being wound around the directly adjacent reinforcement layer.

In another embodiment, said multilayer structure comprises a single reinforcing layer and several sealing layers, said reinforcing layer being would around said adjacent sealing layer.

In one advantageous embodiment, said multilayer structure comprises a single sealing layer and a single composite reinforcement layer, said reinforcement layer being wound around said sealing layer.

All combinations of these two layers are therefore within the scope of the invention, with the proviso that at least said innermost composite reinforcement layer is wound around said outermost adjacent sealing layer, the other layers adhering or not to one another.

Advantageously, in said multilayer structure, each sealing layer consists of a composition comprising the same type of polyamide, in particular a semi-crystalline, particularly aliphatic, polyamide, in particular a long-chain or semi-aromatic polyamide, in particular a long-chain polyamide.

The expression "same type of polyamide" means, for example, a polyamide which may be the same or a different polyamide depending on the layers.

Advantageously, said polyamide is a semi-crystalline, particularly aliphatic, polyamide, in particular a long-chain or a semi-aromatic polyamide, particularly a long-chain polyamide, and said polymer P2j is an epoxy or epoxy-based resin.

In a first variant, said polyamide is a semi-crystalline, particularly aliphatic, polyamide, in particular a long-chain polyamide, and said polymer P2j is an epoxy or epoxy-based resin.

In a second variant, said polyamide is a semi-aromatic, particularly long-chain, polyamide, and said polymer P2j is an epoxy or epoxy-based resin.

Advantageously, the polyamide is identical for all the sealing layers.

Advantageously, said semi-crystalline polyamide is a long-chain aliphatic polyamide, in particular PA1010, PA 1012, PA 1212, PA11, PA12, especially PA 11 or PA12.

Advantageously, the polyamide is a long-chain semi-aromatic polyamide, in particular PA 11/5T, PA 11/6T or PA 11/10T. Obviously in this case, the Amino 11 content in the copolyamide must be chosen carefully so that the Tm of said polymers is lower than 280° C., preferably 265° C.

Advantageously, in said multilayer structure, each reinforcement layer consists of a composition comprising the same type of polymer P2j, in particular an epoxy resin or epoxy-based resin.

Advantageously, the polyamide P2j is identical for all the reinforcement layers.

Advantageously, in said multilayer structure, each sealing layer consists of a composition comprising the same type of polyamide, in particular a semi-crystalline polyamide, and each reinforcing layer consists of a composition comprising the same type of polymer P2j, particular an epoxy or epoxy-based resin.

Advantageously, said polyamide is a long-chain aliphatic semi-crystalline polyamide, in particular PA1010, PA 1012, PA 1212, PA11, PA12, particularly PA 11 or PA12, and said polymer P2j is a semi-aromatic semi-crystalline polyamide, in particular selected from a PA MPMDT/6T, a PA11/10T, a PA 11/BACT, a PA 5T/10T, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/6T, PA 11/MPMDT/10T, PA 11/BACT/10T, a PA and 11/MXDT/10T.

In one embodiment, said multilayer structure consists of a single reinforcing layer and a single sealing layer wherein said polyamide is a long-chain aliphatic semi-crystalline polyamide, in particular PA1010, PA 1012, PA 1212, PA11, PA12, particularly PA 11 or PA12, and said polymer P2j is a semi-aromatic polyamide, in particular selected from a PA MPMDT/6T, a PA11/10T, a PA 11/BACT, a PA 5T/10T, a PA 11/6T/10T, a PA MXDT/10T, a PA MPMDT/10T, a PA BACT/10T, a PA BACT/6T, a PA BACT/10T/6T, a PA 11/BACT/6T, PA 11/MPMDT/6T, PA 11/MPMDT/10T, PA 11/BACT/10T, and a PA 11/MXDT/10T.

In yet another embodiment, the multilayer structure consists of a single reinforcing layer and a single sealing layer wherein said polymer P1i is a long-chain aliphatic semi-crystalline polyamide, in particular PA1010, PA 1012, PA 1212, PA11, PA12, or semi-aromatic semi-crystalline, in particular selected from polyamide 11/5T or 11/6T or 11/10T, MXDT/10T, MPMDT/10T and BACT/10T, particularly PA 11 or PA12 and said polymer P2j is an epoxy or epoxy-based resin.

Advantageously, said multilayer structure further comprises at least one outer layer consisting of a fibrous material made of continuous glass fiber, impregnated with a transparent amorphous polymer, said layer being the outermost layer of said multilayer structure.

Said outer layer is a second reinforcement layer, but transparent, which makes it possible to be able to place text on the structure.

Regarding the Fibrous Material

Regarding the fibers making up said fibrous material, they are in particular mineral, organic or plant fibers.

Advantageously, said fibrous material may be sized or unsized.

Said fibrous material can therefore comprise up to 3.5% by weight of an organic material (of thermosetting or thermoplastic resin type), referred to as sizing.

The mineral fibers include carbon fibers, glass fibers, basalt or basalt-based fibers, silica fibers, or silicon carbide fibers, for example. The organic fibers include thermoplastic or thermosetting polymer-based fibers, such as semi-aromatic polyamide fibers, aramid fibers or polyolefin fibers, for example. Preferably, they are amorphous thermoplastic polymer-based and have a glass transition temperature Tg higher than the Tg of the polymer or thermoplastic polymer mixture constituting the pre-impregnation matrix when the latter is amorphous, or higher than the Tm of the polymer or thermoplastic polymer mixture constituting the pre-impregnation matrix when the latter is semi-crystalline. Advantageously, they are semi-crystalline thermoplastic polymer-based and have a melting temperature Tm higher than the Tg of the polymer or thermoplastic polymer mixture constituting the pre-impregnation matrix when the latter is amorphous, or higher than the Tm of the polymer or thermoplastic polymer mixture constituting the pre-impregnation matrix when the latter is semi-crystalline. Thus, there is no melting risk for the organic fibers constituting the fibrous material during the impregnation by the thermoplastic matrix of the final composite. Among the plant fibers of natural origin, mention may be made of natural fibers based on linen, hemp, lignin, bamboo, silk, and other cellulose-based fibers, in particular viscose-based fibers. These plant fibers can be used pure, treated or coated with a coating layer, in order to facilitate the adherence and impregnation of the thermoplastic polymer matrix.

The fibrous material may also be a fabric, a braided or woven with fibers.

It may also correspond to fibers with support threads.

These component fibers may be used alone or in mixtures. Thus, organic fibers may be mixed with the mineral fibers to be pre-impregnated with thermoplastic polymer powder and to form the pre-impregnated fibrous material.

The organic fiber strands may have several grammages. They can further have several geometries. The component fibers of the fibrous material can further assume the form of a mixture of these reinforcing fibers with different geometries. The fibers are continuous fibers.

Preferably, the fibrous material is selected from glass fibers, carbon fibers, basalt fibers or basalt-based fibers, or a mixture thereof, in particular carbon fibers.

It is used in the form of a strand or several strands.

According to another aspect, the present invention relates to a method for producing a multilayer structure as defined above, characterized in that it comprises a step of preparing the sealing layer by extrusion blow molding, rotational molding, or half-shell injection molding.

In one embodiment, said method for producing a multilayer structure comprises a step of filament winding of the reinforcement layer as defined above around the sealing layer as defined above.

All the features detailed above also apply to the method.

BRIEF DESCRIPTION OF THE FIGURES

EXAMPLES

In all the examples, the tanks are obtained by rotational molding of the sealing layer (liner) at a temperature adapted to the nature of the thermoplastic resin used.

Examples

Products Used

The polyamide used is Rilsan®PA11 (BESNO, sold by Arkema),
  The thermal stabilizer is ANOX® NDB TL89: phenol phosphite organic stabilizer sold by Chemtura.
  The carbodiimide used is Stabiliser®9000 (poly-(1,3,5-triisopropylphenylene-2,4-carbodiimide) sold by Raschig.
  The catalyst used is H3PO3 or H3PO4.
  BBSA: n-butylbenzene sulfonamide sold by PROVIRON
  EXXELOR VA 1801: polyolefin (maleic anhydride-functionalized ethylene-propylene copolymer) sold by Exxon.

Example 1: Evaluation of the Compositions of the Invention: Melt Viscosity and Thermal Resistance at 140° C.

The proportions indicated are percentages by weight relative to the total weight of the composition.

Test on twin-screw extruder (Coperion ZSK40 having two screws with a diameter of 40 mm and a length corresponding to 40 times the diameter thereof) at 280° C.-300 rpm under vacuum—600 mmHg at 60 kg/h.

The PA base is dried (<0.1% humidity)

The compositions of the invention and comparative compositions are presented in table 1

TABLE 1

|  | Comp. 1 | Comp. 2 | Inv. 1 | Inv. 2 |
|---|---|---|---|---|
| BBSA | 6 | 12 | 0 | 1.5 |
| PA 11 + 600 ppm $H_3PO_4$ (Inherent viscosity: 1.45) | 82.8 | 76.8 | 88.8 | 87.3 |
| EPR 1801 | 10 | 10 | 10 | 10 |
| ANOX NDB TL89 | 0.2 | 0.2 | 0.2 | 0.2 |
| STABILISER 9000 | 1 | 1 | 1 | 1 |

Example 2: Comparison of the Properties of the Compositions According to the Invention with Comparative Composition 1

Liners made of PA11 with the comparative composition 1 and comparative composition 2 and the compositions of the invention 1 and 2 were prepared by rotational molding.

The hydrogen permeability is determined according to the following protocol: this consists in flushing the upper face of the film with the test gas (hydrogen) and in measuring the flow that diffuses through the film in the lower part by gas chromatography, flushed by the carrier gas: nitrogen The experimental conditions are presented in table 2 and the results are presented in table 3:

TABLE 2

| Device | LYSSY GPM500/GC coupling |
|---|---|
| Detection | Chromatographic (TCD) |
| Column | Poraplot Q (L = 27.5 m, Dint = 0.530 mm, Ep.film = 20 µ) |
| Vector gas | NITROGEN |
| Diffusing gas | HYDROGEN U (H2) |
| Test surface area | 50 $cm^2$ |
| Calibration | Absolute by direct injection through a septum |
| Pressure at column head | 18 psi |
| Oven temperature | Isothermal 30° C. |
| Detector temperature | 200° C. detector: TCD [−] |
| Injector temperature | Temperature of the lyssy injection loop |
| Temperature/relative humidity | 23° C./0% RH |

TABLE 3

| Liner based on composition | Permeability H2 |
|---|---|
| Comp 1 | 371 cc · $mm/m^2$ · 24 h · atm |
| Comp 2 | 480 cc · $mm/m^2$ · 24 h · atm |
| Inv 1 | 265 cc · $mm/m^2$ · 24 h · atm |
| Inv 2 | 290 cc · $mm/m^2$ · 24 h · atm |

The results of table 3 show a lower hydrogen permeability of the liners prepared from the compositions of the invention (Inv 1 and Inv 2).

Example 3: Notched Charpy Impact Strength at −30° C. According to ISO 179-1:2010

The same liners as for example 2 were prepared by rotational molding.

These liners were tested for notched Charpy impact strength at −30° C.

The notched Charpy impact strength results are shown in table 4.

TABLE 4

| Liner based on composition | Notched Charpy impact strength at −30° C. |
|---|---|
| Inv 1 | 10 kJ/m2 |
| Inv 2 | 10 kJ/m2 |
| Comp. 1 | 7 kJ/m2 |
| Comp. 2 | 6 kJ/m2 |

The cold resistance of the PA11 liners without plasticizer or with 1.5% of plasticizer is greater than those of the PA11 liner with 6% plasticizer or 12% plasticizer.

The invention claimed is:

1. A multilayer structure comprising, from the inside to the outside, at least one sealing layer and at least one composite reinforcing layer,
   said innermost composite reinforcing layer being wound around said outermost adjacent sealing layer,
   at least an innermost sealing layer consisting of a composition comprising, relative to the total weight of the composition:
   a. 20.5 to 99.845% by weight of at least one polyamide;
   b. 0.005 to 0.5% by weight of at least one catalyst;
   c. 0.05 to 1% by weight of at least one thermal stabilizer;
   d. 0.1 to 3% by weight of at least one oligo- or polycarbodiimide;
   e. 0 to 1.5% by weight of at least one plasticizer;
   f. 0 to less than 15% by weight of at least one polyolefin;
   g. 0 to 30% of at least one additive,
   and at least one of said composite reinforcing layers consisting of a fibrous material in the form of continuous fibers, which is impregnated with a composition predominantly comprising at least one polymer P2j, j=1 to m, m being the number of reinforcing layers,
   wherein the multilayer structure is a tank configured for storing hydrogen,
   wherein the tank has a permeability to hydrogen at 23° C. of less than 480 cc·mm/m²·24h·atm at 23° C., under 0% relative humidity (RH).

2. The multilayer structure according to claim 1, wherein each sealing layer comprises the same type of polyamide.

3. The multilayer structure according to claim 1, wherein each reinforcement layer comprises the same type of polymer.

4. The multilayer structure according to claim 2, wherein each sealing layer comprises the same type of polyamide and each reinforcing layer comprises the same type of polymer.

5. The multilayer structure according to claim 1, wherein it has a single sealing layer and a single reinforcing layer.

6. The multilayer structure according to claim 1, wherein said polyamide of the innermost sealing layer is a long-chain aliphatic polyamide or semi-aromatic, wherein the long-chain aliphatic polyamide is a polyamide having an average number of carbon atoms per nitrogen atom of greater than 8.5.

7. The multilayer structure according to claim 1, wherein said polymer P2j is an epoxy resin or epoxy-based resin.

8. The multilayer structure according to claim 6, wherein said multilayer structure consists of a single reinforcing layer and a single sealing layer in which said long-chain aliphatic polyamide or semi-aromatic, and said polymer P2j is an epoxy resin or epoxy-based resin.

9. The multilayer structure according to claim 1, wherein said melt viscosity of said composition of said innermost sealing layer is substantially constant up to 20 minutes.

10. The multilayer structure according to claim 1, wherein said composition of said innermost sealing layer additionally has resistance to thermo-oxidation.

11. The multilayer structure according to claim 1, wherein said composition of said innermost sealing layer has a melt viscosity of 13,000 to 23,000 Pa·s, as determined by oscillatory rheology at 270° C., 10 rad/sec under nitrogen flushing with 5% deformation and 10 sec−1 shear between two parallel plates 25 mm in diameter.

12. The multilayer structure according to claim 1, wherein the fibrous material of the composite reinforcing layer is selected from glass fibers, carbon fibers, basalt fibers or basalt-based fibers, or a mixture thereof.

13. The multilayer structure according to claim 1, wherein said structure further comprises at least one outer layer consisting of a fibrous material made of continuous glass fibers, which is impregnated with a transparent amorphous polymer, said layer being the outermost layer of said multilayer structure.

14. A method for producing a multilayer structure as defined in claim 1, wherein it comprises a step of preparing the sealing layer by extrusion blow molding.

15. The method for producing a multilayer structure as defined in claim 14, wherein it comprises a step of filament winding of the reinforcing layer around the sealing layer.

16. The multilayer structure according to claim 1, wherein the polymer in the at least one of said composite reinforcing layer is an epoxy resin or epoxy-based resin.

17. The multilayer structure according to claim 1, wherein the multilayer structure is devoid of nucleating agent.

18. The multilayer structure according to claim 1, wherein the at least one composite reinforcing layer is the outermost layer of the multilayer structure.

* * * * *